March 21, 1933.  E. A. BESTE  1,902,055
DRILLING MACHINE
Filed July 11, 1931
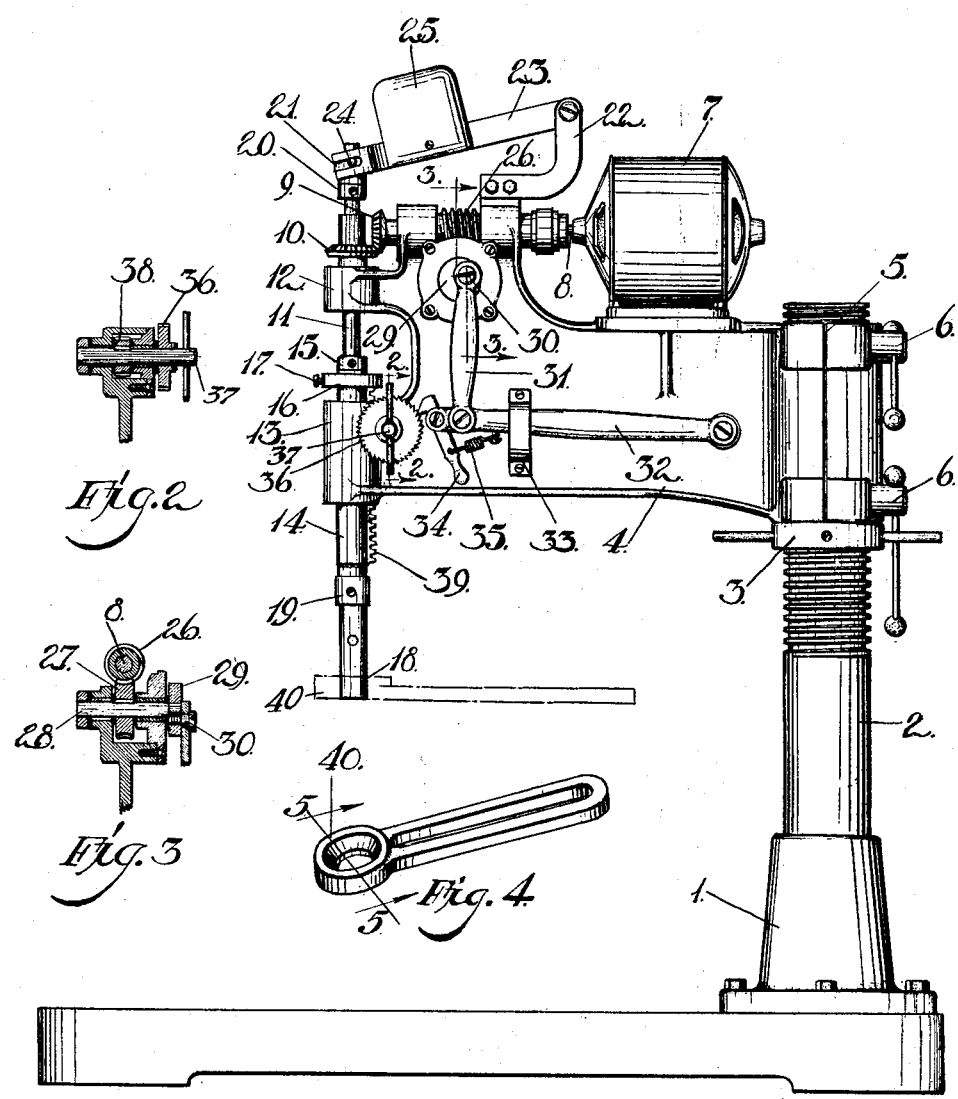
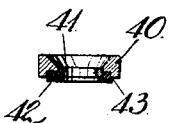
ERNST A. BESTE
INVENTOR
BY Lyman C. Conger
ATTORNEY Patented Mar. 21, 1933

1,902,055

UNITED STATES PATENT OFFICE

ERNST A. BESTE, OF KOHLER, WISCONSIN

DRILLING MACHINE

Application filed July 11, 1931. Serial No. 550,239.

My invention relates to drilling machines adapted to the drilling of hard substances, particularly substances which are not only extremely hard but are also somewhat frangible.

The object of my invention is to provide a method and mechanism for drilling such substances in a cheap, efficient and commercially satisfactory manner.

The mechanism which I use in attaining this object is illustrated in the accompanying drawing, in which Figure 1 is a side elevation of the drilling machine; Fig. 2 is a sectional view of the ratchet wheel assembly along the lines 2—2 of Fig. 1; Fig. 3 is a sectional view of the worm gear assembly along the lines 3—3 of Fig. 1; Fig. 4 is a perspective view of a U bolt forming a guide with a concave upper surface adapted to retain abrasive material as hereinafter described; and Fig. 5 is a cross section of the guide along the lines 5—5 of Fig. 4.

Similar numerals refer to similar parts throughout the several views.

In the drawing the numeral 1 refers to the base of the drilling machine to which the standard 2 is attached in any suitable manner. The upper portion of the standard 2 is threaded to receive the nut 3. The drill frame 4 is divided at 5 forming, in effect, a split sleeve and is held in position by tightening screws 6. This provides a means of adjustment of the height of the drill frame and drill by adjustment of the nut 3 and also allows the drill frame to be swung radially about the standard, facilitating the positioning of the drill head and also allowing the drill frame to be swung out of the way when placing ware in position for drilling or removing it after the drilling operation. Once the proper adjustment is obtained, the tightening screws 6 are drawn up tightly, securing the drill frame in position on the standard.

Positioned on the drill frame 4 is an electric motor 7 connected to a drive shaft 8 which is journaled in bifurcations of the drill frame 4. At the end of the drive shaft 8 is connected a bevel pinion 9 having engagement with a bevel gear 10 keyed on the drill shaft 11, thereby causing the drill shaft to be rotated by the revolutions of the motor.

The drill frame 4 is bifurcated to form journals 12 and 13 in which the drill shaft 11 is journaled. The drill shaft 11 also passes through a sleeve 14 which fits inside the journal 13 of the drill frame. The drill shaft has a collar 15 thereon which serves to limit its downward movement by contact with the sleeve 14. The sleeve 14 has a stop collar 16 adjustably mounted thereon and held in position by means of a set screw 17. The drill head 18, which is a tubular piece of steel or other metal, is secured to the drill shaft by a chuck 19 or in any other suitable manner.

The drill shaft 11 has a collar 20 held near its upper end by a set screw. This collar serves to support a sleeve 21 which surrounds the drill shaft. An angle bracket 22 is mounted on the upper portion of the drill frame 4. The link bar 23 has one end pivotally mounted on the angle bracket 22 and has a U-shaped slot in the other end in which a pin 24 on the sleeve 21 is slidably movable. A weight 25 is mounted on the link bar 23, and its effect is to force the drill head strongly against the ware being drilled, yet allow it to be raised therefrom by the mechanism hereafter described.

A worm 26, mounted on the drive shaft 8, drives a worm gear 27 which is mounted on the shaft 28. The crank wheel 29 is mounted on one end of the shaft 28 and has the crank pin 30 eccentrically mounted thereon. The connecting link 31 is pivotally mounted at one end to the crank pin 30 and pivotally mounted at the other end and to the reciprocating arm 32, which operates within the guide 33, is pivotally mounted at one end, and has a pawl 34 pivotally mounted at the other end. A spring 35 serves to keep the bill of the pawl 34 in contact with the teeth of a ratchet wheel 36. The ratchet wheel 36 is mounted on the shaft 37 on which the pinion 38 is also mounted in such manner as to register with the rack 39 which is attached to or forms an integral part of the sleeve 14.

A guide 40 having a concave upper surface surrounds the drill head 18 and rests upon the ware being drilled. This guide may be formed in a U bolt as shown in Fig. 4, the bolt being attached to a drilling template or to a separate standard, so as to surround the drill head as shown by the dotted lines of Fig. 1, or the guide may be formed directly in a template which is used to hold the ware in position while drilling.

A bushing 41 is fitted within the bore of the guide 40, forming a replaceable wearing surface. An annular gasket 42 of rubber or other suitable material is fitted in a groove 43 between the bushing 41 and the guide 40 and extends for some distance beyond the bushing so as to contact the ware being drilled when the guide is placed upon it. This forms a firm and leak-proof connection between the guide and the ware, the resiliency of the gasket compensating for any irregularities in the surface of the ware, and prevents the abrasive from leaking out over the surface of the ware.

The method of operation of the device is as follows:

The ware to be drilled is positioned beneath the drill head and clamped in place, or a suitable template may be used. The guide 40 is placed in position around the drill head, clamped down firmly upon the ware, and filled with a suitable abrasive compound. In practice I have found a mixture of emery dust and lard oil to give satisfactory results.

The motor is then started, causing the drill to rotate and produce a cutting action due to the abrasive which is confined between the drill head and the ware being drilled. The weight 25 acts to press the drill firmly against the ware so as to cut through it as rapidly as possible. It will be understood that since the drill head is in tubular form, it cuts in a circle leaving a core at the center.

The revolutions of the drive shaft 8 not only rotate the drill but also, through the worm 26, the worm gear 27 and the connecting link 31, impart a reciprocal movement to the reciprocating arm 32. This movement, acting through the pawl 34, the ratchet wheel 36, the pinion 38 and the rack 39, raises the drill shaft and drill upwardly on the downward movement of the reciprocating arm and lowers it upon the ware during the upward movement thereof. The relationship of the gears is such as to cause one such raising and lowering of the drill shaft for each complete revolution thereof.

The tendency of the drill to force or squeeze the abrasive from between itself and the ware is thus obviated as the drill is alternately lifted from the ware and pressed against the ware by the action of the weight 25, allowing the abrasive to flow under it when lifted, thus keeping a continuous supply of fresh abrasive between the drill head and the ware being drilled and attaining a maximum speed of cutting.

It is obvious that equivalents for elements of the construction may suggest themselves to those skilled in the art; therefore, I do not limit myself to the exact details described, but claim all equivalents of method and mechanism which are within the spirit of my invention.

I claim:

1. A guide for a drill having a concave upper surface adapted to hold a supply of abrasive, a bore lined with a replaceable bushing, and a rubber gasket concentric to said bushing and extending beyond said bushing and said guide.

2. In a drill wherein an abrasive is the cutting medium, the combination of a standard, a drill frame, a split sleeve connected to said drill frame and concentric to said standard, tightening screws in said split sleeve member whereby said member may be clamped upon said standard and thereby maintain any desired lateral adjustment of the drill frame, a nut screw threaded on said standard and adapted to support and provide vertical adjustment for said split sleeve member and said drill frame, a drill shaft mounted on said drill frame, means for causing the rotation of said drill shaft including a motor mounted on said frame, means actuated by said rotating means for causing reciprocation of said drill shaft simultaneously with the rotation thereof, a weight operatively connected with said drill shaft whereby to create pressure of the drill on the work, a stop collar adjustably mounted on said drill shaft whereby to limit the downward movement of said drill, a drill guide, a concave surface in said drill guide adapted to hold a supply of abrasive in juxtaposition to said drill, and means for positioning said drill guide upon the ware to be drilled.

3. In a drill wherein an abrasive is the cutting medium, the combination of a drill frame, a standard, a split sleeve member connected to said drill frame and concentric to said standard, tightening screws in said split sleeve member whereby to clamp said split sleeve member against said standard and maintain any desired lateral adjustment of the aforesaid drill frame, a nut screw threaded on said standard and adapted to support and provide vertical adjustment for said split sleeve member and said drill frame, a drill shaft mounted on said drill frame, means mounted on said drill frame for rotating said drill shaft, means actuated by said rotating means for causing reciprocation of said drill shaft simultaneously with the rotation thereof, a drill mounted on said drill shaft, a drill guide, a concave surface in said drill guide adapted to hold a supply of abrasive in juxtaposition to said drill, and means for positioning said drill guide upon the ware to be drilled.

4. In a drill wherein an abrasive is the cutting medium, the combination of a standard, a drill frame vertically and laterally adjustable thereon, a drill shaft mounted on said drill frame, means comprising a drive shaft mounted on said drill frame for rotating said drill shaft, a worm mounted on said drive shaft, a worm gear in engagement therewith, a crank wheel connected to said worm gear and actuated thereby, a link pivotally and eccentrically connected to said crank wheel, a reciprocable arm pivotally connected at one extremity to said drill frame and pivotally connected at a point intermediate its extremities to said link, a rack mounted on said drill shaft, a pinion in engagement with said rack, a ratchet wheel having a driving connection with said pinion, a pawl mounted on said reciprocable arm and adapted to engage said ratchet wheel during the downward reciprocation of said arm whereby said drill shaft is alternately lifted and allowed to feed downwardly by gravity simultaneously with the rotation of said drill shaft, a drill mounted on said drill shaft, a drill guide, a concave surface in said drill guide adapted to hold a supply of abrasive in juxtaposition to said drill, and means for positioning said drill guide upon the ware to be drilled.

5. In a drill wherein an abrasive is the cutting medium, the combination of a vertically positioned drill shaft, a drill mounted thereon, a drill guide, a bore in said drill guide adapted to receive said drill, a concave surface adapted to receive a supply of abrasive in said drill guide and contiguous to said bore, means for positioning said drill guide upon the ware to be drilled, means comprising a drive shaft for rotating the aforesaid drill shaft, a worm mounted on said drive shaft, a worm gear in engagement therewith, a crank wheel connected to said worm gear and actuated thereby, a link pivotally and eccentrically connected to said crank wheel, a reciprocable arm pivotally mounted at one extremity and pivotally connected at a point intermediate its extremities to said link, a rack mounted on said drill shaft, a pinion in engagement with said rack, a ratchet wheel having a driving connection with said pinion, and a pawl mounted on said reciprocable arm and adapted to engage said ratchet wheel during the downward reciprocation of said arm whereby said drill shaft is alternately lifted and allowed to feed downwardly by gravity simultaneously with the rotation of said drill shaft.

6. In a drill wherein an abrasive is the cutting medium, the combination of a drill shaft, a drill mounted thereon, a drill guide adapted to receive and guide said drill, a concave surface in said guide adapted to hold a supply of abrasive in juxtaposition to said drill, means for positioning said drill guide upon the ware to be drilled, means comprising a drive shaft for rotating said drill shaft, a worm mounted on said drive shaft, a worm gear in engagement therewith, a crank wheel connected to said worm gear and actuated thereby, a link pivotally and eccentrically connected to said crank wheel, a reciprocable arm pivotally mounted at one extremity and pivotally connected at a point intermediate its extremities to said link, a rack mounted on said drill shaft, a pinion in engagement with said rack, the ratchet wheel having a driving connection with said pinion, and a pawl mounted on said reciprocable arm and adapted to engage said ratchet wheel during the downward reciprocation of said arm whereby said drill shaft is alternately lifted and allowed to feed downwardly by gravity simultaneously with the rotation of said drill shaft and whereby to allow abrasive to flow under the drill during the lifting thereof as aforesaid.

ERNST A. BESTE.